United States Patent
Parry

(10) Patent No.: US 8,005,505 B2
(45) Date of Patent: Aug. 23, 2011

(54) IDENTIFYING REMOTE, EXTERNAL DEVICES AND FACILITATING COMMUNICATION THEREWITH

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1612 days.

(21) Appl. No.: 10/179,331

(22) Filed: Jun. 25, 2002

(65) Prior Publication Data

US 2004/0204029 A1 Oct. 14, 2004

(51) Int. Cl.
H04M 1/00 (2006.01)
(52) U.S. Cl. .................. 455/556.1; 455/556.2; 455/557; 455/41.2
(58) Field of Classification Search ............... 455/556.1, 455/556.2, 557, 418, 419, 420, 41.1, 41.2, 455/552.1
See application file for complete search history.

(56) References Cited

U.S. PATENT DOCUMENTS

| 6,493,104 | B1* | 12/2002 | Cromer et al. ............... 358/1.15 |
| 6,738,631 | B1* | 5/2004 | Adler et al. ................ 455/456.6 |
| 6,891,857 | B1* | 5/2005 | Nevo et al. .................... 370/480 |
| 6,928,264 | B2* | 8/2005 | Botteck ........................ 455/41.2 |
| 6,970,263 | B2* | 11/2005 | Suzuki et al. ................ 358/1.15 |
| 2001/0037462 | A1* | 11/2001 | Bengtson ...................... 713/201 |
| 2002/0052182 | A1* | 5/2002 | Mayuzumi ...................... 455/41 |
| 2002/0082026 | A1* | 6/2002 | Narayanan .................... 455/456 |
| 2003/0050963 | A1* | 3/2003 | Lamming et al. ............. 709/203 |
| 2004/0184063 | A1* | 9/2004 | Baldwin ...................... 358/1.13 |

* cited by examiner

Primary Examiner — Minh D Dao

(57) ABSTRACT

A method for enabling a portable electronic device, such as a personal data assistant (PDA), cellular telephone, or notebook computer, to identify remote, external devices with which communication by at least one wireless transmission protocol over which the portable electronic device is capable of communicating may be established. The method includes selecting a type of wireless transmission protocol to be used, receiving signals from devices that are remote from the portable electronic device, and, based upon such signals identifying the remote, external devices that can communicate by the at least one wireless transmission protocol. A list of these devices may then be generated. One of the devices may be automatically selected or selected by the user of the portable electronic device from such a list.

16 Claims, 2 Drawing Sheets

IDENTIFYING REMOTE, EXTERNAL DEVICES AND FACILITATING COMMUNICATION THEREWITH

FIELD OF THE INVENTION

The present invention relates generally to selecting a remote device to which a portable electronic device will transmit information. More specifically, the present invention relates to selecting a remote device from a group of remote devices with which the portable electronic device is able to communicate.

BACKGROUND OF THE INVENTION

As the use of portable electronic devices, such as cellular telephones, personal digital assistants (PDAs), notebook computers, and the like becomes more common, so does the number of devices with which such portable electronic devices may communicate.

By way of example, portable electronic devices may communicate with printers, scanners, modems, network ports, other portable electronic devices, and computers. Connections may be established between a portable electronic device and other devices in a variety of ways, including both hard connections (e.g., via wires or cables) and wireless connections.

Wireless connections are typically established by one of a variety of wireless transmission protocols, which are different ways of wirelessly communicating data between remotely located devices. Examples of wireless transmission protocols that are currently in use include WAP (Wireless Application Protocol), GSM (Global System for Mobile communications, which employs 900, 1800, and 1900 MHz radio waves), SMS (Short Message Service) (an addition to GSM that enables text messaging), i-Mode (enables cellular telephone users to access the Internet), BLUETOOTH (which employs short range radio waves in a frequency band at 2.4 GHz), and 822.11a and 822.11b (which employ electromagnetic radiation of 5 GHz and 2.4 GHz, respectively). The ability of a portable electronic device to communicate by one or more of these wireless transmission protocols depends upon the type of wireless transmission protocol by which the communication elements of such devices are configured to communicate.

Conventionally, identifying software for a particular external device has been downloaded into PDA memory through a personal computer (PC). The PDA communicates with the PC when secured within a so-called "cradle" or coupled to another hard connection (e.g., wire), which is, in turn, coupled to a communication port of the PC. As the PDA is "hard-wired" to the PC, software that corresponds to and identifies the external device, as well as any drivers for causing information to be wirelessly conveyed to the external device and initiating operation of the external device, may be downloaded to memory associated with the PDA through the PC.

Alternatively, a PDA user may bring the PDA in proximity to a particular external device with which wireless communication is desired. Upon identifying the type of proximate external device to the PDA, the PDA may receive signals broadcast by the proximate external device to identify that external device and to store information about the identity of that proximate external device. Subsequent use of that external device requires user-selection thereof prior to the wireless transmission of data thereto by the PDA.

As another alternative, software may be downloaded onto memory associated with a PDA, as described above, to enable the PDA to identify, through an infrared (IR) port thereof, a printer that includes an infrared port to which the PDA is brought into close proximity (e.g., one to two feet), and to transmit information to that printer. The usefulness of such software is limited to printers. Moreover, this type of software is not useful for substantially concurrently identifying a plurality of devices with which the PDA may wirelessly communicate. Rather, a PDA user is typically required to locate an external device with which the PDA is to communicate and bring the PDA in proximity to that external device before the software may enable the PDA to identify the external device and before the PDA may establish communication with the external device.

External devices may be identified to cellular telephones that include PDA programming in the same manner described herein with respect to PDAs.

Similar methods have been used to identify particular external devices to other types of portable electronic devices. For example, drivers, typically in the form of software, may be downloaded to memory of notebook computers prior to such a computer recognizing a particular external device with which external communication is desired. Alternatively, a notebook computer may be brought into proximity to a particular external device with which wireless communication is desired. Using the appropriate setup software for that type of external device, the type of external device may be identified to the notebook computer by the user thereof and the notebook computer may receive signals that are broadcast by the proximate external device to identify the same. The identity of that external device may be stored, along with the software drivers for use therewith or information for accessing the appropriate software drivers. Subsequently, when communication with that external device is desired, the user may select the stored identity for that device, then cause data to be transmitted thereto.

Each of these methods requires prior identification of each external device with which communication may be established to a portable electronic device. The user of the portable electronic device may then select only from external devices that were previously identified to the portable electronic device, limiting use of the portable electronic device with external devices in new environments.

Many state of the art portable electronic devices, as well as the remote, external electronic devices with which wireless communication may be desired, are equipped with one or more wireless communication components (in place of or in addition to infrared communication ports) that are configured to communicate by way of a wireless transmission protocol type that differs from that employed by conventional IR communication ports.

SUMMARY OF THE INVENTION

The present invention includes a method and program for evaluating any signals that may be detected at a particular location and identifying the device or devices that are broadcasting the detected signals. Each of the detected signals may be of a single type of wireless protocol transmission or of a plurality of different wireless protocol transmission types.

The present invention may be embodied as a program in the form of software or as firmware or programmed hardware for use with a portable electronic device, such as a PDA, a cellular telephone (e.g., a cellular telephone including a PDA or a web-enabled cellular telephone), or another portable electronic device. The program of the present invention operates in such a way as to identify only devices that are broadcasting detected signals of a wireless protocol transmission type by which the portable electronic device is able to communicate. When the portable electronic device can communicate by way of more than one type of wireless transmission protocol, the program may effect the identification of each device that is broadcasting detected signals of each type of wireless transmission protocol, or at least some of the types of wireless transmission protocols by which the portable electronic device can communicate.

One embodiment of the method and program of the present invention includes selecting at least one type of wireless transmission protocol to be used. In addition, a type of device (e.g., a printer, a network port, etc.) with which communication is desired may be selected. Signals of the at least one type of wireless transmission protocol that has been selected and, if a specific device type was selected, signals that originated from devices of the specified type are then detected. A list of devices from which the detected signals originated may then be generated. The method also includes displaying the list, from which a user of the portable electronic device may select a device with which to communicate.

Other features of the present invention will become apparent to those of ordinary skill in the art through consideration of the ensuing description, the accompanying drawings, and the appended claims.

DESCRIPTION OF THE DRAWINGS

In the drawings, which illustrate various aspects of various embodiments of the present invention.

DETAILED DESCRIPTION OF THE INVENTION

Figure 1:
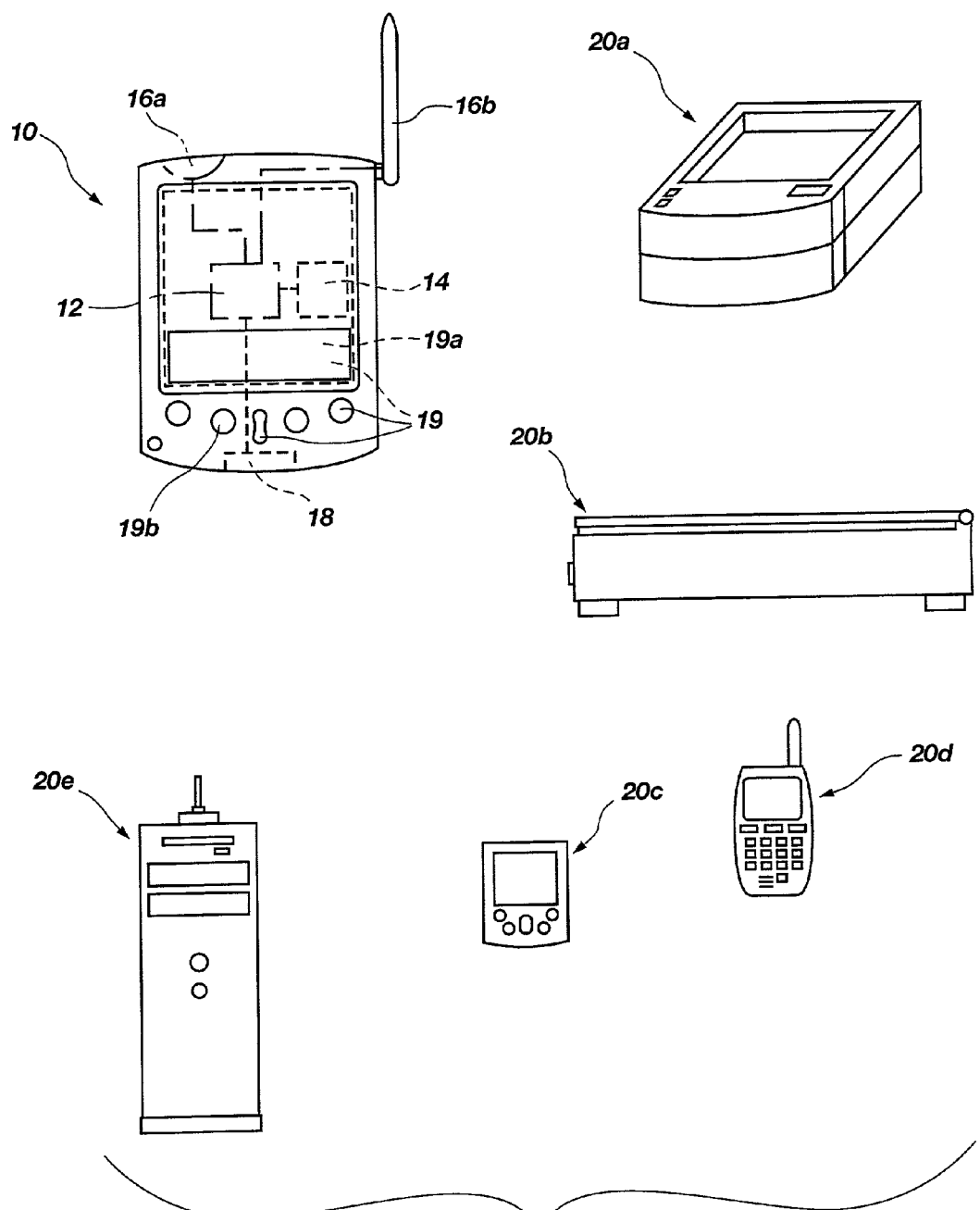
FIG. 1 is a schematic representation of an example of a portable electronic device by which the method of the present invention may be effected and the receipt of signals by the portable electronic device that are broadcast by various external devices remote thereto, as well as the communication of information by the portable electronic device to one of the remote devices.

Referring to drawing FIG. 1 depicted is one embodiment of portable electronic device 10 that may be used in accordance with the present invention. While portable electronic device 10 is depicted as being a PDA, such as a PALM™ III, a PALM™ V, a PALM™ VII, a PALM™ m100 or m105, or a PALM™ m500 or m505, available from Palm, Inc. of Santa Clara, Calif., or a PDA, such as those available from Handspring, Inc., Sony, Inc., Compaq, Inc., Hewlett Packard, Inc., Palo Alto, Calif., and a number of other manufacturers, other types of portable electronic devices, including, without limitation, cellular telephones (e.g. internet-enabled cellular telephones, cellular telephones including PDA-type programming, etc.), notebook computers, and the like, may be used in accordance with teachings of the present invention. Portable electronic device 10 may include a processor 12, at least one memory device 14 associated with processor 12, and at least one wireless communication device 16 associated with processor 12. In addition, portable electronic device 10 may include one or more hard communication ports 18, each of which also communicates with processor 12.

Memory device 14 may comprise random access memory (RAM), flash memory (e.g., flash electrically erasable programmable memory (EEPROM)), a hard drive, a floppy disk drive and floppy disk, a compact disk-read-only memory (CD-ROM) drive and CD-ROM, or any other suitable type of memory device, as known in the art. While FIG. 1 depicts portable electronic device 10 as including a single memory device 14, portable electronic devices that include multiple memory devices 14, as well as different types of memory devices 14 are also within the scope of the present invention.

As depicted, portable electronic device 10 includes two wireless communication devices 16, which are identified as wireless communication devices 16a and 16b. By way of example only, wireless communication device 16a may comprise an infrared (IR) emitter and sensor, while wireless communication device 16b may include a radio frequency (RF) emitter and antenna/receiver. Portable electronic device 10 may alternatively include a single wireless communication device 16 or more than two wireless communication devices 16. In portable electronic devices 10 that include more than one wireless communication device 16, wireless communication devices 16 may be of the same or different types and/or operate by way of wireless transmission protocols of the same or different types.

Hard communication port 18, if any, may similarly comprise any suitable, known type of communication port. By way of example only, hard communication port 18 may be a serial, parallel, or USB port, a network interface, a modem (e.g., 56K, DSL, cable, T1, etc.), or any other known device for establishing communication between a computer and one or more other, external devices.

As many types of portable electronic devices, such as portable electronic device 10, are typically carried from place to place by a user thereof, it is also often desirable to use a portable electronic device 10 to receive information from and to transmit information to other, remote devices without the requirement that hard connections be established between portable electronic device 10 and the one or more external, remote devices with which communication may be desired.

Also depicted in drawing FIG. 1 is a portable electronic device 10 and a plurality of external devices 20 with which portable electronic device 10 may wirelessly communicate when carried to a specific location. The examples of external devices 20 illustrated in FIG. 1 include printers 20a, scanners 20b, other portable electronic devices 20c and 20d, and other computers 20e, including the servers of local area networks (LANs). Each external device 20 communicates by way of at least one type of wireless transmission protocol. In addition, each external device 20 broadcasts signals that include identifying information about the particular external device 20 from which each signal originates. Such signals may be broadcast by way of each type of wireless transmission protocol by which that external device 20 is able to wirelessly communicate.

One aspect of the present invention includes a method that may be used with a portable electronic device 10, such as that depicted in drawing FIG. 1, at a variety of different locations to facilitate communication between portable electronic device 10 and one or more external devices 20 with which portable electronic device 10 is able to communicate at each location. The method includes identifying each external device 20 with which a particular portable electronic device 10 may remotely, or wirelessly, communicate. A list of available external devices 20 may then be generated. The user of portable electronic device 10 may then select one of the identified, remote devices to which portable electronic device 10 will transmit information.

The present invention also includes a program or group of programs by which a method incorporating teachings of the present invention may be affected. Such programs may be embodied as software and, thus, maintained on one or more storage media, such as a hard drive, a floppy disk, compact disk-read-only memory (CD-ROM), random-access memory (RAM), or the like. Alternatively, programs according to the present invention may be in the form of firmware or programmed or programmable hardware.

Such a program may, of course, be written in a programming language that will be understood by each processor 12 with which the program is to be used. A program according to the present invention may be embodied as software, which is maintained on a memory device 14 associated with processor 12 and which may be accessed by processor 12, as firmware or as programmed hardware. Each of these embodiments of programs, as well as the manner in which each of these types of programs may be generated and used, are well-known in the art. An example of the process flow of a program according to the present invention, as well as of a method of the present invention, is depicted in the flow chart of drawing FIG. 2.

The method or a program embodying the present invention may be initiated either manually or automatically. A user of portable electronic device 10 may manually cause portable electronic device 10 to execute the program by selecting the program and/or entering an appropriate command into an input element 19 of portable electronic device 10, as known in the art (e.g., by touching a part of a touch-sensitive screen 19$a$ that displays an icon that corresponds to the program, by pressing a button 19$b$ of portable electronic device that will initiate the program, by use of a mouse, keypad, keyboard, etc.). A program according to the present invention may be automatically executed upon a user's providing an appropriate command (e.g., a print command, a transmit command, etc.) within the confines of another program (e.g., a word processing program, an e-mail program, a spreadsheet program, a presentation program, a database index, etc.) being operated by processor 12 of portable electronic device 10.

Figure 2:
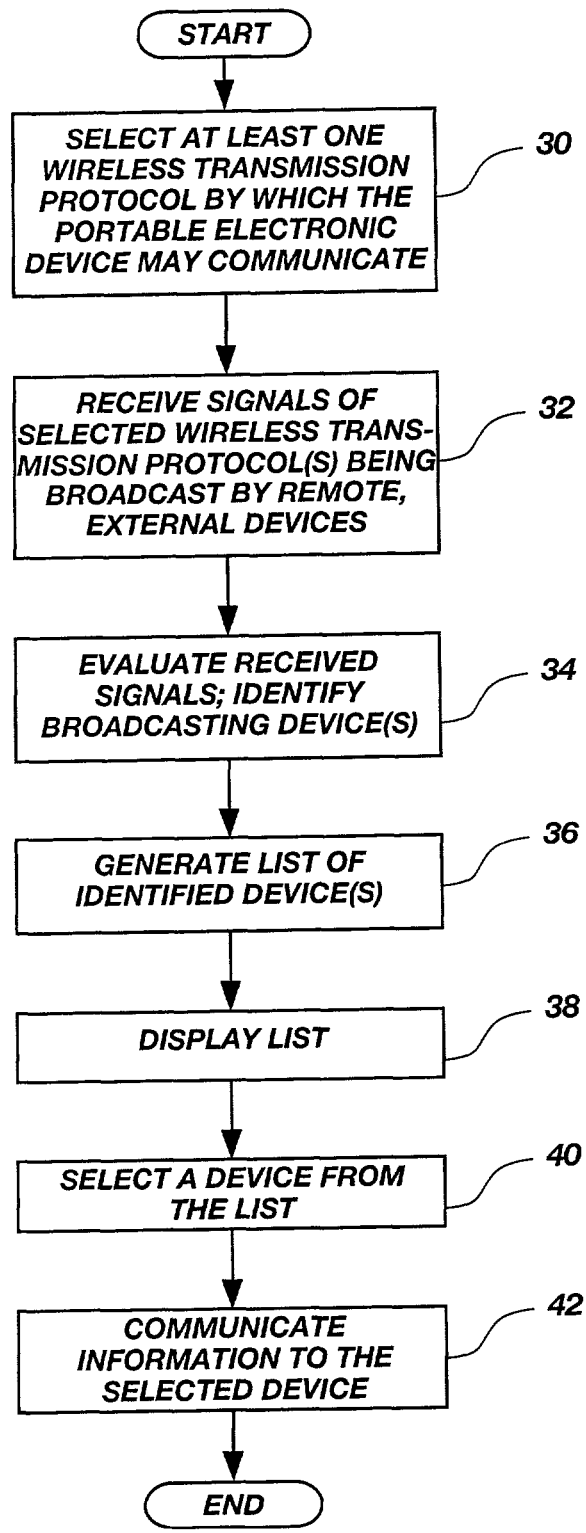
FIG. 2 is a flow chart illustrating an exemplary embodiment of a process according to the present invention.

At reference character 30 of drawing FIG. 2, at least one wireless transmission protocol by which one or more wireless communication devices 16 (FIG. 1) of portable electronic device 10 are able to communicate is selected. Each wireless transmission protocol which is selected may be chosen automatically, by identifying the types of wireless transmission protocols by which wireless communication devices 16 of a portable electronic device 10 are able to communicate, manually, by querying a user of portable electronic device 10, or otherwise, as known in the art.

Once at least one type of wireless transmission protocol 30 has been selected, process flows to reference character 32 of drawing FIG. 2. At reference character 32, an appropriate wireless communication device 16 (FIG. 1) of portable electronic device 10 receives signals that are transmitted by way of a corresponding, selected type of wireless transmission protocol 30. The received signals may be digitized and communicated to processor 12, as known in the art.

At reference character 34 of drawing FIG. 2, processor 12 (FIG. 1) of portable electronic device 10 evaluates each digitized signal communicated thereto. Since the signal broadcast by each external device 20 that is capable of wirelessly communicating with portable electronic device 10 includes information about the identity of that external device 20, including the type (i.e., brand and model) of device, as well as a substantially unique identifier for the signal-broadcasting device, processor 12 may determine the specific external device 20 that was the source of the signal that corresponds to that digital signal.

From there, process flows to reference character 36 of drawing FIG. 2, where processor 12 (FIG. 1) may generate a list including the identity of each external device that has broadcast a signal that has been received by a wireless communication device 16 (FIG. 1) of portable electronic device 10 and identified by processor 12.

Next, at reference character 38 of drawing FIG. 2, the list that has been generated by processor 12 (FIG. 1) may be communicated by processor 12 to an output device associated therewith, such as a display 11 of portable electronic device 10.

From the output list, an external device 20 (FIG. 1) to which processor 12 may communicate information through a wireless communication device 16 of portable electronic device 10 may be selected, at reference character 40 of drawing FIG. 2. The selection of an external device 20 may be effected manually, by querying a user to select a desired external device 20 from the list, or automatically.

Manual selection of an external device 20 may be effected by use of an input element 19, such as a touch-sensitive screen, a button, a mouse, a keypad or keyboard, a voice command, or the like, depending, of course, upon the capabilities of the portable electronic device 10 being used. In the PDA example of a portable electronic device 10, a user may select an external device 20 listed on display 11 by touching the portion of display 11 at which that external device 20 is listed (e.g., with a so-called "stylus") to highlight the identifier for that external device 20, then touching that portion of display 11 again to select the highlighted device.

If the external device 20 to which processor 12 is to communicate information is automatically selected, the selection of that external device 20 may be effected randomly or based on one or more different criteria. By way of example only, automatic selection of an external device 20 may be based on an evaluation of the signals that are received by a wireless communication device 16 of portable electronic device 10, such as the relative strengths and/or clarities of such received signals, on the availability of external device 20 or number of tasks awaiting attention thereby, or on the queues of, external devices 20 from which signals were received, on the types of external devices 20 from which signals were received, or on the compatibilities of external devices 20 from which signals were received with portable electronic device 10.

Once an external device 20 (FIG. 1) has been selected, at reference character 40 of FIG. 2, process flows to reference character 42 of drawing FIG. 1. At reference character 42, processor 12 causes information to be communicated through a wireless communication device 16 of portable electronic device 10 to the selected external device 20, as known in the art. Such information may be communicated in the form of digital data embodied in either digital or analog signals. Of course, the type of wireless transmission protocol 30 that is used to communicate information from portable electronic device 10 to the external device 20 is compatible with a type of wireless transmission protocol 30 by which at least one wireless communication device 16 of portable electronic device 10 and the selected external device 20 are able to communicate.

Upon the communication of information by portable electronic device 10 to the selected external device 20, the selected external device 20 may utilize such information as instructed by processor 12 of portable electronic device 10 and as known in the art.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A process for identifying and selecting remote devices that may be used in conjunction with at least one task to be performed by a portable electronic device, the portable electronic device having a plurality of wireless communication devices, the process comprising:
selecting a wireless protocol transmission type from a plurality of wireless protocol transmission types by which the plurality of wireless communication devices are configured to communicate with a plurality of different types of remote devices;
before the portable electronic device receives signals of the selected wireless protocol transmission type, selecting a type of remote device of the plurality of different types of remote devices;
after both selecting the type of remote device and selecting the wireless protocol transmission type, causing the portable electronic device to receive signals of the selected wireless protocol transmission type utilizing a selected one of the plurality of wireless communication devices compatible with the selected wireless protocol transmission type; and
evaluating the received wireless protocol transmission type signals to identify a remote device of the selected type of remote devices; and
displaying on the portable electronic device the identified remote device.

2. The process according to claim 1, wherein the causing the portable electronic device to receive signals of the selected wireless protocol transmission type includes receiving signals from a plurality of different remote devices.

3. The process according to claim 2, wherein evaluating comprises evaluating the received signals to identify each remote device of the selected type of remote device to the user.

4. The process according to claim 3, further comprising:
generating a list of identities of each of the remote devices.

5. The process according to claim 4, further comprising:
selecting a remote device from the list.

6. The process according to claim 5, wherein the selecting includes automatic selection.

7. The process according to claim 5, wherein the selecting includes the user of the portable electronic device selecting.

8. The process according to claim 5, further comprising:
transmitting information to the remote device selected from the list.

9. A portable electronic device, comprising:
a processor;
a plurality of wireless communication devices in communication with the processor, the wireless communication devices being configured to receive and transmit signals using a plurality of different wireless transmission protocol types; and
a memory in communication with the processor, the memory comprising a program for instructing the processor to:
select a wireless protocol transmission type from the plurality of wireless protocol transmission types for communication to a plurality of different types of remote devices;
before the portable electronic device receives signals of the selected wireless protocol transmission type, select a type of remote device of the plurality of different types of remote devices;
after both the selection of the type of remote device and the selection of the wireless protocol transmission type, cause a selected one of the wireless communication compatible with the selected wireless transmission protocol type to receive signals of the selected wireless transmission protocol; and
after selection of the type of remote device, evaluate the signals to identify a remote device of the selected device type.

10. The portable electronic device of claim 9, wherein the program is configured to permit a user to select the selected device type.

11. The portable electronic device of claim 9, wherein the program is configured to cause the processor to identify each remote device of the selected type from which a signal of the selected wireless transmission protocol type is received.

12. The portable electronic device of claim 11, wherein the program is further configured to cause the processor to generate a list of identities of each remote device of the selected type from which a signal of the selected wireless transmission protocol type is received.

13. The portable electronic device of claim 12, wherein the program causes the processor to select a remote device from the list.

14. The portable electronic device of claim 13, wherein selection of the remote device from the list is automatically effected by the processor under control of the program.

15. The portable electronic device of claim 13, wherein selection of the remote device from the list is effected by a user selecting a remote device from the list by way of an input device in communication with the processor.

16. The portable electronic device of claim 15, wherein the program is further configured to cause the processor to transmit information to the selected remote device.

* * * * *